(12) United States Patent
Schmidt

(10) Patent No.: US 6,228,162 B1
(45) Date of Patent: May 8, 2001

(54) PROCESS FOR PREPARING NEW CRYSTAL MODIFICATIONS OF C.I. PIGMENT RED 53:2

(75) Inventor: Martin U. Schmidt, Frankfurt am Main (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/464,820

(22) Filed: Dec. 17, 1999

(30) Foreign Application Priority Data

Dec. 19, 1998 (DE) .............................. 198 58 853

(51) Int. Cl.[7] .......................... C09B 67/48; C09B 67/10; C09B 63/00
(52) U.S. Cl. ......................... 106/493; 106/494; 534/575; 534/588
(58) Field of Search .................................. 106/493, 494; 534/575, 588

(56) References Cited

U.S. PATENT DOCUMENTS

| | | | |
|---|---|---|---|
| 4,248,635 | 2/1981 | Herring et al. | 106/22 |
| 4,719,292 | * 1/1988 | Schui et al. | 534/575 |
| 5,266,110 | 11/1993 | Rieper et al. | 106/496 |

FOREIGN PATENT DOCUMENTS

| | | |
|---|---|---|
| 112833 | 12/1899 | (DE) . |
| 145908 | 9/1902 | (DE) . |
| 146655 | 1/1903 | (DE) . |
| 167468 | 7/1904 | (DE) . |
| 198 27 272 | 12/1999 | (DE) . |
| 198 27 273 | 12/1999 | (DE) . |
| 0 097 913 | 1/1984 | (EP) . |
| 0 545 072 | 6/1993 | (EP) . |
| 965 616 | * 12/1999 | (EP) . |
| 965 617 | * 12/1999 | (EP) . |
| 2 432 538 | 2/1980 | (FR) . |
| 10-204313 | 8/1998 | (JP) . |

OTHER PUBLICATIONS

Registry No. 67990–35–6, CN C.I. Pigment Red 53:2 (no date).*
Abstract of Japan, Publication No. 08302232 (Nov. 19, 1996).
Abstract of Japan, Publication No. 09194752 (Jul. 29, 1997).
Abstract of Japan, Publication No. 09227791 (Sep. 2, 1997).
Abstract of Japan, Publication No. 09268259 (Oct. 14, 1997).
European Search Report (4/2000).
Article 579. Peter Griess, Aus: Brt. Off. Chem. Ges. XI c1878), pp. 2191–2199 (no month).
Abstract for EP 0 097 913 (1/1988).
Abstract for EP 0 545 072 (11/1993).
Abstract for FR 2 432 538 (2/1981).
Abstract Of Japan, Publication No. 10231438 (Sep. 2, 1998).
Derwent Patent Family Report and/or Abstract for German Patent No. 198 27 273 (12/99).
Derwent Patent Family Report and/or Abstract for German Patent No. 198 27 272 (12/99).

* cited by examiner

*Primary Examiner*—Anthony Green
(74) *Attorney, Agent, or Firm*—Susan S. Jackson; Scott E. Hanf

(57) ABSTRACT

C.I. Pigment Red 53:2 is obtained in new crystal modifications (epsilon, zeta, eta, theta, iota, kappa, lambda, nu, xi, omicron, pi and rho phases) by heating any other phase of this pigment in certain organic solvents and reprecipitating the pigment. The new crystal phases differ from one another in rheology and coloristics.

11 Claims, No Drawings

PROCESS FOR PREPARING NEW CRYSTAL MODIFICATIONS OF C.I. PIGMENT RED 53:2

FIELD OF THE INVENTION

C.I. Pigment Red 53:2 (below: P.R.53:2) is defined as the compound of the formula (I) which forms from the coupling of diazotized 2-amino-5-chloro-4-methylbenzenesulfonic acid with β-naphthol and subsequent reaction of the resulting sulfo acid with a calcium salt (M=½ $Ca^{2+}$).

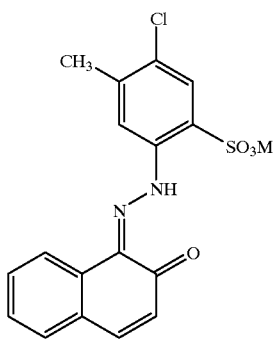

(1)

In the solid state, the compound of the formula (1) may also be present in another tautomeric or cis/trans isomeric form and may also contain $Na^+$ ions, $Cl^-$ ions, water molecules, and solvent molecules.

The majority of organic pigments exist in a plurality of different crystal modifications, also referred to as phases. Crystal modifications have the same chemical composition but a different arrangement of the building blocks (molecules) in the crystal. The crystal structure determines the chemical and physical properties, and therefore the individual crystal modifications often differ in rheology, color, and other coloristic properties. The different crystal modifications can be identified by means of X-ray powder diffractometry.

To date only three crystal modifications of P.R.53:2 (M=½ $Ca^{2+}$) have been disclosed, which are referred to as the α-phase, γ-phase and δ-phase (German Patent Applications 198 27 272.3 and 198 27 273.1).

The alpha-phase is distinguished by the following characteristic lines in the X-ray powder pattern: 2Θ values in degrees (relative intensities): 5.1 (100); 6.6 (73); 10.2 (37); 12.2 (39); 13.8 (31); 14.4 (27); 17.8 (24); 18.4 (22); 20.4 (20); 24.6 (26); 25.8 (86).

The γ-phase shows the following characteristic lines: 4.4 (49); 5.8 (100); 8.8 (23); 10.3 (25); 10.9 (33); 12.2 (15); 13.9 (16); 15.4 (15); 16.7 (28); 17.6 (16); 18.4/18.6 (18/18, double line); 19.7 (20); 20.8 (18); 23.2 (48); 24.0 (21); 24.8 (37); 25.2 (34); 26.6 (19); 27.3 (19); 27.9 (12); 29.3 (14).

The δ-phase shows the following characteristic lines: 3.3 (32), 4.7 (100), 7.5 (14), 9.4 (19), 10.5 (13), 13.8 (10), 14.2 (9), 14.9 (10), 16.7 (11), 17.6 (9), 18.1 (16), 18.9 (10), 20.4 (7), 21.1 (9), 22.1 (9), 22.7 (12), 23.1 (9), 23.6 (13), 24.1 (9), 24.9 (10), 25.5 (23), 26.3 (9), 27.7 (9), 28.1 (6), 28.9 (6), 30.4 (6).

It has surprisingly been found that the phase of C.I. Pigment Red 53:2 can be transformed into new phases by heating the pigment in certain liquid media, with full or partial dissolution of the pigment, and subsequently reprecipitating the pigment.

SUMMARY OF THE INVENTION

The present invention therefore provides a process for the phase transformation of C.I. Pigment Red 53:2, which comprises heating C.I. Pigment Red 53:2 in one or more organic solvents or a mixture of said solvents with water, the water content being from 0 to 90% by weight, in particular from 1 to 50% by weight, with the exception of the solvents isopropanol, isobutanol, amyl alcohol, chlorobenzene, and N-methylpyrrolidone, at a temperature of from 30 to 300° C., preferably from 60 to 200° C., and reprecipitating the pigment.

DESCRIPTION OF THE PREFERRED EMBODIMENTS

Preference is given to solvents from the group consisting of dimethylacetamide; methanol, ethanol, n-propanol, $C_6$–$C_{16}$ alcohol; n-butanol; sec-butanol; acetone, butanone; xylene, trimethylbenzene, dichlorobenzene, chloronaphthalene, nitrobenzene, phenetol, pyridine, dimethyl phthalate, ethyl acetate, methyl isobutyl ketone, acetophenone; quinoline; morpholine; dimethylformamide, N-methylformamide; ethylene glycol; glycolic acid n-butyl ester, and dimethyl sulfoxide.

In accordance with the process of the invention it is possible to prepare crystal modifications of P.R.53:2 which are distinguished by the following characteristic lines (Cu—$K_\alpha$ radiation 2Θ values in degrees, d values in Å$^{-1}$, relative Intensity ($I_{rel}$) in %):

| 2Θ | d | $I_{rel}$ |
|---|---|---|
| ε(epsilon)-phase: | | |
| 4.48 | 19.7 | 55 |
| 5.87 | 15.1 | 36 |
| 7.08 | 12.5 | 61 |
| 7.87 | 11.2 | 100 |
| 9.01 | 9.8 | 32 |
| 9.84 | 9.0 | 49 |
| 11.84 | 7.5 | 25 |
| 12.47 | 7.1 | 32 |
| 14.31 | 6.2 | 26 |
| 14.80 | 6.0 | 27 |
| 15.29 | 5.8 | 26 |
| 15.82 | 5.6 | 58 |
| 16.80 | 5.3 | 27 |
| 17.23 | 5.1 | 29 |
| 18.80 | 4.7 | 40 |
| 19.40 | 4.6 | 27 |
| 19.82 | 4.5 | 46 |
| 20.66 | 4.3 | 33 |
| 21.44 | 4.1 | 29 |
| 21.88 | 4.1 | 36 |
| 22.69 | 3.9 | 17 |
| 23.14 | 3.8 | 19 |
| 23.85 | 3.7 | 40 |
| 24.63 | 3.6 | 34 |
| 25.48 | 3.5 | 32 |
| 26.12 | 3.4 | 76 |
| 26.42 | 3.4 | 65 |
| 27.91 | 3.2 | 26 |
| 28.76 | 3.1 | 29 |
| 29.88 | 3.0 | 12 |
| 30.30 | 2.9 | 12 |
| 31.68 | 2.8 | 20 |
| 31.98 | 2.8 | 13 |
| 32.36 | 2.8 | 16 |
| 32.60 | 2.7 | 17 |
| ζ („zeta")-phase: | | |
| 5.10 | 17.3 | 24 |

-continued

| 2Θ | d | I$_{rel}$ |
|---|---|---|
| 7.13 | 12.4 | 62 |
| 7.97 | 11.1 | 100 |
| 10.09 | 8.8 | 68 |
| 14.27 | 6.2 | 54 |
| 14.67 | 6.0 | 24 |
| 15.92 | 5.6 | 14 |
| 17.13 | 5.2 | 18 |
| 17.84 | 5.0 | 40 |
| 18.70 | 4.7 | 18 |
| 19.07 | 4.7 | 20 |
| 19.93 | 4.5 | 29 |
| 21.53 | 4.1 | 26 |
| 22.76 | 3.9 | 56 |
| 23.58 | 3.8 | 92 |
| 24.58 | 3.6 | 28 |
| 25.25 | 3.5 | 16 |
| 25.95 | 3.4 | 99 |
| 27.38 | 3.3 | 29 |
| 27.95 | 3.2 | 14 |
| 28.62 | 3.1 | 48 |

η („eta")-phase:

| 2Θ | d | I$_{rel}$ |
|---|---|---|
| 4.57 | 19.3 | 100 |
| 9.07 | 9.7 | 68 |
| 12.18 | 7.3 | 45 |
| 14.77 | 6.0 | 65 |
| 21.09 | 4.2 | 30 |
| 26.60 | 3.3 | 96 |

θ („theta")-phase:

| 2Θ | d | I$_{rel}$ |
|---|---|---|
| 5.17 | 17.0 | 26 |
| 10.34 | 8.5 | 13 |
| 12.17 | 7.3 | 9 |
| 13.24 | 6.7 | 10 |
| 14.60 | 6.1 | 23 |
| 15.79 | 5.6 | 15 |
| 16.63 | 5.3 | 27 |
| 17.80 | 5.0 | 28 |
| 18.04 | 4.9 | 16 |
| 19.71 | 4.5 | 13 |
| 21.06 | 4.2 | 17 |
| 24.08 | 3.7 | 12 |
| 24.47 | 3.6 | 12 |
| 25.82 | 3.4 | 100 |
| 26.67 | 3.4 | 33 |
| 27.81 | 3.2 | 10 |
| 28.52 | 3.1 | 17 |

ι („jota")-phase:

| 2Θ | d | I$_{rel}$ |
|---|---|---|
| 4.20 | 21.1 | 100 |
| 8.35 | 10.6 | 93 |
| 10.86 | 8.1 | 60 |
| 11.42 | 7.7 | 35 |
| 12.37 | 7.2 | 56 |
| 13.84 | 6.4 | 32 |
| 15.48 | 5.7 | 64 |
| 15.94 | 5.6 | 40 |
| 16.45 | 5.4 | 43 |
| 17.05 | 5.2 | 33 |
| 17.50 | 5.1 | 31 |
| 18.59 | 4.8 | 63 |
| 19.58 | 4.5 | 47 |
| 19.86 | 4.5 | 52 |
| 20.80 | 4.3 | 42 |
| 21.13 | 4.2 | 32 |
| 21.30 | 4.1 | 35 |
| 21.64 | 4.1 | 34 |
| 22.14 | 4.0 | 26 |
| 22.33 | 4.0 | 29 |
| 22.77 | 3.9 | 36 |
| 23.25 | 3.8 | 39 |
| 23.59 | 3.8 | 93 |
| 24.07 | 3.7 | 45 |
| 25.49 | 3.5 | 64 |
| 26.46 | 3.4 | 55 |
| 26.69 | 3.3 | 35 |
| 29.49 | 3.0 | 45 |

-continued

| 2Θ | d | I$_{rel}$ |
|---|---|---|

κ („kappa")-phase:

| 2Θ | d | I$_{rel}$ |
|---|---|---|
| 6.55 | 13.5 | 32 |
| 12.62 | 7.0 | 26 |
| 12.99 | 6.8 | 28 |
| 13.73 | 6.4 | 50 |
| 14.33 | 6.2 | 36 |
| 15.01 | 5.9 | 32 |
| 15.47 | 5.7 | 30 |
| 16.30 | 5.4 | 24 |
| 16.78 | 5.3 | 23 |
| 17.14 | 5.2 | 38 |
| 18.31 | 4.8 | 60 |
| 18.70 | 4.7 | 44 |
| 20.39 | 4.4 | 25 |
| 24.33 | 3.4 | 22 |
| 24.70 | 3.6 | 38 |
| 25.34 | 3.5 | 48 |
| 26.14 | 3.4 | 100 |
| 27.24 | 3.3 | 27 |
| 28.00 | 3.2 | 24 |
| 28.25 | 3.2 | 24 |
| 29.91 | 3.0 | 22 |

λ („lambda")-phase:

| 2Θ | d | I$_{rel}$ |
|---|---|---|
| 5.03 | 17.5 | 100 |
| 5.35 | 16.5 | 57 |
| 6.88 | 12.8 | 26 |
| 9.43 | 9.4 | 23 |
| 11.09 | 8.0 | 30 |
| 13.78 | 6.4 | 17 |
| 14.36 | 6.2 | 21 |
| 15.70 | 5.6 | 15 |
| 18.25 | 4.9 | 18 |
| 18.90 | 4.7 | 19 |
| 20.36 | 4.4 | 16 |
| 20.68 | 4.3 | 16 |
| 21.38 | 4.2 | 15 |
| 22.90 | 3.9 | 18 |
| 24.46 | 3.6 | 22 |
| 25.00 | 3.6 | 18 |
| 26.14 | 3.4 | 28 |
| 28.54 | 3.1 | 14 |

ν („ny")-phase:

| 2Θ | d | I$_{rel}$ |
|---|---|---|
| 4.76 | 18.5 | 64 |
| 7.70 | 11.5 | 43 |
| 9.22 | 9.6 | 24 |
| 9.50 | 9.3 | 46 |
| 11.64 | 7.6 | 15 |
| 12.74 | 6.9 | 21 |
| 13.43 | 6.6 | 33 |
| 13.76 | 6.4 | 15 |
| 14.11 | 6.3 | 13 |
| 14.27 | 6.2 | 15 |
| 15.72 | 5.6 | 16 |
| 16.26 | 5.4 | 10 |
| 17.37 | 5.1 | 12 |
| 17.73 | 5.0 | 20 |
| 18.95 | 4.7 | 20 |
| 19.91 | 4.5 | 20 |
| 20.45 | 4.3 | 12 |
| 20.87 | 4.3 | 19 |
| 21.51 | 4.1 | 13 |
| 22.79 | 3.9 | 21 |
| 23.12 | 3.8 | 28 |
| 23.44 | 3.8 | 20 |
| 24.59 | 3.6 | 17 |
| 25.26 | 3.5 | 49 |
| 25.96 | 3.4 | 29 |
| 26.35 | 3.4 | 100 |
| 27.05 | 3.3 | 44 |
| 28.03 | 3.2 | 14 |
| 28.72 | 3.1 | 10 |
| 29.38 | 3.0 | 8 |
| 29.89 | 3.0 | 7 |
| 31.30 | 2.9 | 9 |

-continued

| 2Θ | d | $I_{rel}$ |
|---|---|---|
| 32.12 | 2.8 | 7 |
| 32.50 | 2.8 | 9 |
| 33.27 | 2.7 | 8 |

ξ („xi")-phase:

| 2Θ | d | $I_{rel}$ |
|---|---|---|
| 4.88 | 18.1 | ca. 50 |
| 7.83 | 11.3 | 100 |
| 8.59 | 10.3 | 39 |
| 11.57 | 7.6 | 21 |
| 15.76 | 5.6 | 34 |
| 17.06 | 5.2 | 46 |
| 17.40 | 5.1 | 24 |
| 19.66 | 4.5 | 36 |
| 19.99 | 4.4 | 54 |
| 20.40 | 4.4 | 27 |
| 21.41 | 4.1 | 28 |
| 21.83 | 4.1 | 31 |
| 24.49 | 3.6 | 68 |
| 25.00 | 3.6 | ca. 70 |
| 26.83 | 3.3 | 21 |
| 27.15 | 3.3 | 17 |
| 31.33 | 2.9 | 20 |
| 31.60 | 2.8 | 18 | o („omikron")-phase:

| 2Θ | d | $I_{rel}$ |
|---|---|---|
| 12.54 | 7.1 | 58 |
| 13.61 | 6.5 | 44 |
| 17.33 | 5.1 | 47 |
| 18.64 | 4.8 | 52 |
| 19.48 | 4.6 | 26 |
| 24.56 | 3.6 | 100 |
| 25.43 | 3.5 | 56 |

π („pi")-phase:

| 2Θ | d | $I_{rel}$ |
|---|---|---|
| 5.60 | 15.8 | 100 |
| 9.09 | 9.7 | 82 |
| 9.62 | 9.2 | 72 |
| 11.21 | 7.9 | 27 |
| 11.65 | 7.6 | 4 |
| 12.86 | 6.9 | 5 |
| 15.24 | 5.8 | 6 |
| 15.88 | 5.6 | 22 |
| 16.85 | 5.3 | 14 |
| 18.23 | 4.9 | 21 |
| 19.07 | 4.7 | 35 |
| 19.40 | 4.6 | 54 |
| 20.82 | 4.3 | 20 |
| 22.23 | 4.0 | 24 |
| 23.02 | 3.9 | 27 |
| 23.49 | 3.8 | 23 |
| 24.79 | 3.6 | 98 |
| 26.01 | 3.4 | 41 |
| 27.66 | 3.2 | 75 |
| 28.20 | 3.2 | 10 |
| 30.12 | 3.0 | 9 |
| 30.85 | 2.9 | 9 |
| 31.34 | 2.9 | 9 |
| 31.52 | 2.8 | 6 |
| 31.59 | 2.8 | 6 |

ρ („rho")-phase:

| 2Θ | d | $I_{rel}$ |
|---|---|---|
| 4.96 | 17.8 | 100 |
| 6.05 | 14.6 | 60 |
| 8.48 | 10.4 | 22 |
| 9.95 | 8.9 | 14 |
| 13.93 | 6.4 | 13 |
| 15.12 | 5.9 | 13 |
| 15.51 | 5.7 | 13 |
| 17.54 | 5.1 | 14 |
| 19.41 | 4.6 | 14 |
| 20.99 | 4.2 | 12 |
| 21.50 | 4.1 | 14 |
| 24.64 | 3.6 | 13 |
| 25.44 | 3.5 | 23 |

-continued

| 2Θ | d | $I_{rel}$ |
|---|---|---|
| 26.00 | 3.4 | 40 |
| 26.89 | 3.3 | 16 |
| 28.15 | 3.2 | 11 |

All line positions are associated with an uncertainty of ±0.2°.

In addition to Ca ions, the phases of the invention may also include Na ions, Cl ions, water molecules, and solvent molecules in the crystal lattice.

The new phases differ from the known crystal modifications in terms of their properties. They are of low solubility and are distinguished by orange to red hues, in some cases brown, high color strengths, and good coloristic properties.

In order to obtain a phase transformation, P.R.53:2 starting material is present in a phase which differs from that to be prepared, preferably in the alpha phase. It is also possible to use phase mixtures. The P.R.53:2 used as starting material can be used in the form of a dry pigment, a water-moist presscake, or an aqueous suspension.

The epsilon phase is obtained by heating C.I. Pigment Red 53:2 in any other modification at a temperature of from 40° C. to 200° C., preferably from 60° C. to the boiling point of the solvent, under atmospheric pressure in dimethylacetamide or a mixture of dimethylacetamide and up to 90% by weight water, in particular up to 50% by weight of water, judiciously for from 1 minute to 6 hours, preferably from 10 minutes to 2 hours, during which the pigment fully or partly dissolves. Longer heating is possible in principle but is accompanied by no technical advantages. The pigment is subsequently precipitated, for example, by lowering the temperature and/or by adding water, a second solvent of lower solvency, and/or a salt, e.g., NaCl, and/or by changing the pH.

Heating can be carried out under atmospheric pressure, at subatmospheric pressure, or at superatmospheric pressure.

Examples of suitable second solvents are benzene or alkanes.

The change in pH can be induced by adding acids or bases.

The zeta phase is formed analogously if methanol, ethanol, n-propanol, or an alcohol of 6 to 16 carbon atoms is used as solvent instead of dimethylacetamide.

The eta phase is formed analogously if 1-butanol is used as the solvent.

The theta phase is formed analogously if xylene, trimethylbenzenes, dichlorobenzenes, chloronaphthalenes, nitrobenzene, phenetol, pyridine, dimethyl phthalate, ethyl acetate, methyl isobutyl ketone, butanone, or acetophenone are/is used as the solvent.

When quinoline or acetophenone is used, a mixture of θ-phase and ζ-phase is formed.

The iota phase is formed analogously if morpholine is used as the solvent.

The kappa phase is formed if N-methylformamide is used as solvent and the pigment is fully dissolved.

The lambda phase is formed analogously if acetone is used as the solvent and the pigment is used in the form of the water-moist presscake. Treatment of dry pigment with acetone produces the theta phase.

The nu phase is formed similarly to the epsilon phase if ethylene glycol is used as the solvent.

The xi phase is formed analogously if glycolic acid n-butyl ester is used as a solvent.

The omicron phase is formed analogously if the solvent used comprises a mixture of N-methylformamide and from 10 to 90% by weight, based on the solvent mixture, water, and the pigment is not fully dissolved.

The pi phase is formed similarly to the epsilon phase if dimethyl sulfoxide is used as the solvent.

The rho phase is formed analogously if dimethylformamide is used as the solvent.

In the preparation of the zeta, eta, theta, iota, lambda-, nu, xi, pi- and rho phases the respective solvent can contain up to 90% by weight of water or water up to the saturation concentration, except for the preparation of the theta-phase with acetone.

In all cases, the crystal modifications, or mixtures of different crystal modifications, which form may be dependent on the applied temperatures, temperature progressions, and concentrations, and also on the presence or absence of crystal nuclei, impurities, or extraneous substances.

P.R.53:2 in the modifications or modification mixtures of the invention can be isolated hot or after cooling, for example, to room temperature, isolation being possible in the customary manner, e.g., by filtration, or by evaporation of the solvent, with or without the application of reduced pressure. It can be judicious to wash the presscake or residue with water or with an organic liquid, examples being lower alcohols such as methanol, ethanol, propanol, and isopropanol, or with acetone.

Depending on the desired field of application it can be sensible to subject the resultant pigment to mechanical fine division. The fine division can be carried out by wet or dry grinding. Grinding can be followed by treatment with a solvent, with water, or with a solvent/water mixture, in order to convert the pigment to a functional form.

A pure or predominantly pure phase is formed preferentially by starting from a solution already containing seed crystals or crystal nuclei of the desired phase and by cooling this solution so slowly, or adding a second solvent, an acid, base or salts so slowly, for example, over the course of from 1 to 24 hours, that the supersaturation is held within a range in which the rate of crystal growth is relatively high but the rate of crystal nucleation is relatively low, so that the existing crystal nuclei grow with retention of the phase. The use of a mechanical stirrer can be advantageous since it breaks up existing crystals of the desired phase into many smaller fragments which then in turn serve as crystal nuclei for the desired phase (so-called secondary nucleation). If the supersaturation is higher—for example, because the solution is cooled more rapidly or a second solvent, an acid, base or salt is added more rapidly—the crystal nucleation rate is much higher, so that many crystal nuclei of different phases may form spontaneously; in this case, mixtures of different phases are obtained preferentially.

The preparation of a mixture of different phases may be of interest if specific coloristic and rheological properties are desired: for example, a certain orange hue which lies between the hues of the individual phases. On the other hand, it is also possible to concentrate a mixture of individual phases in order to obtain a higher fraction of the desired modification or else to obtain a pure phase, for example, by air classification, recrystallization, selective dissolution or extraction of the unwanted phase, or by repeated use of process measures according to the invention in which the formation of the desired phase is favored.

The present invention therefore also provides a C.I. Pigment Red 53:2 mixture which contains at least 10%, preferably at least 25%, in particular at least 50%, particularly preferably at least 75%, of the $\epsilon$-phase, of the $\zeta$-phase, of the $\eta$-phase, of the $\theta$-phase, of the $\iota$-phase, of the $\kappa$-phase, of the $\lambda$-phase, of the $\nu$-phase, of the $\xi$-phase, of the o-phase, of the $\pi$-phase, of the $\rho$-phase, or of a mixture of said phases.

It is also possible for some (up to 50%) of the Ca ions in the crystal lattice of the crystal modification of the invention to be replaced by other cations, e.g. $Na^+$, $H^+$, $K^+$, $NH_4^+$, $Mg^{2+}$, $Sr^{2+}$, $Ba^{2+}$, $Sn^{2+}$, $Zn^{2+}$, $Mn^{2+}$, $Fe^{2+}$, $Fe^{3+}$, $Al^{3+}$, $Si^{4+}$, $Ti^{4+}$, $TiO^2$, Mixed crystals of this kind may form if other cations, e.g., $Na^+$, $K^+$, $NH_4^+$, $Mg^{2+}$, $Sr^{2+}$, $Ba^{2+}$, $Sn^{2+}$, $Zn^{2+}$, $Mn^{2+}$, $Fe^{2+}$, $Fe^{3+}$, $Al^{3+}$, $Si^{4+}$, $Ti^{4+}$, $TiO^{2+}$ are present during the above-described measures of repairing the crystal modifications of the invention.

To facilitate the preparation of the desired modification, to stabilize the desired modification, to improve the coloristic properties, and to achieve specific coloristic effects it is possible to add pigment dispersants, surfactants, defoamers, extenders, or other additives at any desired points in the process. It is also possible to use mixtures of these additives. The additives may be added all at once or in two or more portions. The additives may be added at any point in the synthesis or in the various aftertreatments, or following the aftertreatments. The most suitable point in time must be determined beforehand by means of exploratory experiments.

C.I. Pigment Red 53:2 in the described modifications or in mixtures comprising said modifications, or in the form of mixed crystals with other cations, is suitable for pigmenting coatings and plastics, for repairing printing inks and aqueous pigment preparations, and for coloring seeds.

The P.R.53:2 phases of the invention are suitable as colorants in electrophotographic toners and developers, such as, for example, one- or two-component powder toners (also called one- or two-component developers), magnetic toners, liquid toners, latex toners, polymerization toners, and specialty toners.

Typical toner binders are additional polymerization resins, polyaddition resins and polycondensation resins, such as styrene resins, styrene-acrylate resins, styrene-butadiene resins, acrylate resins, polyester resins, and phenol-epoxy resins, polysulfones, polyurethanes, individually or in combination, and also polyethylene and polypropylene, which may also contain further ingredients, such as charge control agents, waxes or flow aids, or may be modified subsequently with these additives.

In addition, the P.R.53:2 phases of the invention are suitable as colorants in powders and powder coating materials, especially in triboelectrically or electrokinetically sprayable powder coating materials, which are used to coat the surfaces of articles made, for example, from metal, wood, plastic, glass, ceramic, concrete, textile material, paper, or rubber.

Typical powder coating resins used are epoxy resins, carboxyl- and hydroxyl-containing polyester resins, polyurethane resins and acrylic resins, together with customary hardeners. Resin combinations are also used. For example, epoxy resins are frequently used in combination with carboxyl- and hydroxyl-containing polyester resins. Typical hardener components (depending on the resin system) are, for example, acid anhydrides, imidazoles and also dicyandiamide and its derivatives, blocked isocyanates, bisacylurethanes, phenolic resins and melamine resins, triglycidylisocyanurates, oxazolines, and dicarboxylic acids.

In addition, the P.R.53:2 phases of the invention are suitable for use as colorants in inkjet inks on an aqueous and a nonaqueous basis, and also in those inks which operate in accordance with the hot-melt process.

The P.R.53:2 phases of the invention are also suitable, furthermore, as colorants for color filters, both for additive and for substractive color generation.

EXAMPLES

In the examples below, parts and percentages are by weight.

The cyrstal modification of the resulting products is determined by means of X-ray powder diffractometry.

A) Synthesis of P.R.53:2

226 parts of 2-amino-4-methyl-5-chlorobenzenesulfonic acid are stirred together with 2500 parts of water and 150 parts of 31% strength hydrochloric acid at room temperature. At 20–25° C., diazotization is carried out with 173 parts of 40% strength $NaNO_2$ solution over the course of 30 minutes, and stirring is continued at room temperature for 1 hour.

150 parts of β-naphthol are dissolved in 1100 parts of 4% strength NaOH, and this solution is added to the diazo suspension at room temperature over the course of 60 minutes.

The pH of the suspension is adjusted to 8.0 with NaOH, and 77 parts of $CaCl_2$ and 500 parts of water are added. The suspension is stirred at 95° C. for 15 minutes and filtered while hot and the presscake is washed free of salt. This gives 1271 parts of a presscake of P.R.53:2 in the ∀-phase.

1) Treatment with Dimethylacetamide 52 parts of this presscake are heated to boiling with 200 parts of N,N-dimethylacetamide. The solution cools down overnight. The pigment is precipitated with stirring by adding 150 parts of water, and then filtered off. The residue is washed with water and dried at 60° C. This gives 15 parts of P.R.53:2 in the ε-modification accompanied by small amounts of the sodium salt of P.R.53 as an orange-red powder.

2) Treatment with Ethanol 10 parts of P.R.53:2 in the α-phase are heated to boiling with 1000 parts of ethanol. This system is left to cool down overnight. The pigment is isolated by filtration. The residue is washed with acetone and dried at 60° C. This gives 9 parts of P.R.53:2 in the ζ-modification as a red powder.

3) Treatment with 1-butanol

The procedure of Example 2 is repeated but using 1-butanol instead of ethanol. This gives 8 parts of P.R.53:2 in the η-modification accompanied by small amounts of ζ-modification as a reddish brown powder.

4) Treatment with Acetophenone

The procedure of Example 2 is repeated but using acetophenone instead of ethanol. This gives 9 parts of P.R.53:2 in the θ-modification accompanied by small amounts of ζ-modification as a red powder.

5) Treatment with Morpholine 10 parts of P.R.53:2 in the α-phase are heated to boiling with 1000 parts of morpholine. The solution is left to cool down overnight, 1500 parts of water are added, and the system is heated until a clear solution is obtained. The solution is left to cool down and the precipitated pigment is isolated by filtration. The residue is washed with acetone and dried at 60° C. This gives 8 parts of P.R.53:2 in the ι-modification as a brown powder.

6) Treatment with N-methylformamide

The procedure of Example 5 is repeated but using N-methylformamide instead of morpholine. This gives 8 parts of P.R.53:2 in the κ-modification accompanied by small amounts of θ-modification as an orange-red powder.

7) Treatment with Acetone 40 parts of the water-moist presscake from Example 1 are heated to boiling with 1000 parts of acetone. The system is left to cool down overnight. The pigment is isolated by filtration. The residue is washed with acetone and dried to 60° C. This gives 8 parts of P.R.53:2 in the λ-modification as a red powder.

8) Treatment with Ethylene Glycol

The procedure of Example 2 is repeated but using ethylene glycol instead of ethanol. This gives 9 parts of P.R.53:2 in the ν-modification as a brown powder.

9) Treatment with Glycolic Acid n-butyl Ester

The procedure of Example 2 is repeated but using glycolic acid n-butyl ester instead of ethanol. This gives 9 parts of P.R.53:2 in the ξ-modification as a cloudy orange powder.

10) Treatment with an NMF/Water Mixture 10 parts of P.R.53:2 in the α-phase are heated to boiling with a mixture of 120 parts of N-methylformamide and 80 parts of water. The suspension is left to cool down overnight. The pigment is isolated by filtration. The residue is washed with acetone and dried at 60° C. This gives 9 parts of P.R.53:2 in the o-modification accompanied by small amounts of γ-modification as a red powder.

11) Treatment with DMSO

The procedure of Example 2 is repeated but using dimethyl sulfoxide instead of ethanol. This gives 10 parts of P.R.53:2 in the π-modification as an orange powder.

12) Treatment with DMF 10 parts of P.R.53:2 in the α-phase are heated to boiling with 1000 parts of dimethylformamide. The dimethylformamide is subsequently evaporated at 100° C. under reduced pressure. This gives 10 parts of P.R.53:2 in the ρ-modification as a reddish brown powder.

What is claimed is:

1. A process for the phase transformation of C.I. Pigment Red 53:2, which comprises heating C.I. Pigment Red 53:2 in one or more organic solvents or a mixture of said solvents with water, the water content being from 0 to 90% by weight with the exception of the solvents isopropanol, isobutanol, amyl alcohol, chlorobenzene, and N-methylpyrrolidone, at a temperature of from 30 to 300° C. and precipitating the pigment.

2. The process as claimed in claim 1, wherein heating is carried out at a temperature of from 60° C. to 200° C.

3. The process as claimed in claim 1, wherein the pigment is precipitated by lowering the temperature.

4. The process as claimed in claim 1, wherein the pigment is precipitated by adding water, a solvent of low solvency, a salt, an acid, or an alkali.

5. The process as claimed in claim 1, wherein the pigment is precipitated by evaporating the solvent.

6. The process as claimed in claim 1, wherein C.I. Pigment Red 53:2 in the alpha-phase is used.

7. The process as claimed in claim 1, wherein said organic solvent is dimethylacetamide; methanol, ethanol, n-propanol, $C_6-C_{16}$-alcohol; n-butanol; sec-butanol; acetone, butanone; xylene, trimethylbenzene, dichlorobenzene, chloronaphthalene, nitrobenzene, phenetol, pyridine, dimethyl phthalate, ethyl acetate, methyl isobutyl ketone, acetophenone; quinoline; morpholine; N-methylformamide, dimethylformamide; ethylene glycol; glycolic acid n-butyl ester, or dimethyl sulfoxide.

8. A C.I. Pigment Red 53:2 of the formula (1) or a tautomeric or cis/trans isomeric form thereof (1)
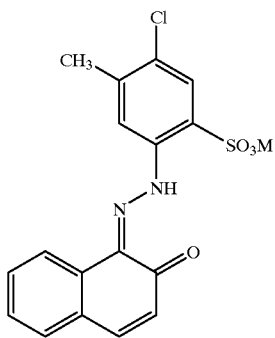
in which M is a cation, with the proviso that at least 50% of the total amount of M is calcium ions, which has the following characteristic reflections in the X-ray powder diffractogram, measured using Cu—Kα radiation:
| 2Θ | d | I_rel |
|---|---|---|
| ε(epsilon)-phase: | | |
| 4.48 | 19.7 | 55 |
| 5.87 | 15.1 | 36 |
| 7.08 | 12.5 | 61 |
| 7.87 | 11.2 | 100 |
| 9.01 | 9.8 | 32 |
| 9.84 | 9.0 | 49 |
| 11.84 | 7.5 | 25 |
| 12.47 | 7.1 | 32 |
| 14.31 | 6.2 | 26 |
| 14.80 | 6.0 | 27 |
| 15.29 | 5.8 | 26 |
| 15.82 | 5.6 | 58 |
| 16.80 | 5.3 | 27 |
| 17.23 | 5.1 | 29 |
| 18.80 | 4.7 | 40 |
| 19.40 | 4.6 | 27 |
| 19.82 | 4.5 | 46 |
| 20.66 | 4.3 | 33 |
| 21.44 | 4.1 | 29 |
| 21.88 | 4.1 | 36 |
| 22.69 | 3.9 | 17 |
| 23.14 | 3.8 | 19 |
| 23.85 | 3.7 | 40 |
| 24.63 | 3.6 | 34 |
| 25.48 | 3.5 | 32 |
| 26.12 | 3.4 | 76 |
| 26.42 | 3.4 | 65 |
| 27.91 | 3.2 | 26 |
| 28.76 | 3.1 | 29 |
| 29.88 | 3.0 | 12 |
| 30.30 | 2.9 | 12 |
| 31.68 | 2.8 | 20 |
| 31.98 | 2.8 | 13 |
| 32.36 | 2.8 | 16 |
| 32.60 | 2.7 | 17 |
| ζ(„zeta")-phase: | | |
| 5.10 | 17.3 | 24 |
| 7.13 | 12.4 | 62 |
| 7.97 | 11.1 | 100 |
| 10.09 | 8.8 | 68 |
| 14.27 | 6.2 | 54 |
| 14.67 | 6.0 | 24 |
| 15.92 | 5.6 | 14 |
| 17.13 | 5.2 | 18 |
| 17.84 | 5.0 | 40 |
| 18.70 | 4.7 | 18 |
| 19.07 | 4.7 | 20 |
| 19.93 | 4.5 | 29 |
-continued
| 2Θ | d | I_rel |
|---|---|---|
| 21.53 | 4.1 | 26 |
| 22.76 | 3.9 | 56 |
| 23.58 | 3.8 | 92 |
| 24.58 | 3.6 | 28 |
| 25.25 | 3.5 | 16 |
| 25.95 | 3.4 | 99 |
| 27.38 | 3.3 | 29 |
| 27.95 | 3.2 | 14 |
| 28.62 | 3.1 | 48 |
| η(„eta")-phase: | | |
| 4.57 | 19.3 | 100 |
| 9.07 | 9.7 | 68 |
| 12.18 | 7.3 | 45 |
| 14.77 | 6.0 | 65 |
| 21.09 | 4.2 | 30 |
| 26.60 | 3.3 | 96 |
| θ(„theta")-phase: | | |
| 5.17 | 17.0 | 26 |
| 10.34 | 8.5 | 13 |
| 12.17 | 7.3 | 9 |
| 13.24 | 6.7 | 10 |
| 14.60 | 6.1 | 23 |
| 15.79 | 5.6 | 15 |
| 16.63 | 5.3 | 27 |
| 17.80 | 5.0 | 28 |
| 18.04 | 4.9 | 16 |
| 19.71 | 4.5 | 13 |
| 21.06 | 4.2 | 17 |
| 24.08 | 3.7 | 12 |
| 24.47 | 3.6 | 12 |
| 25.82 | 3.4 | 100 |
| 26.67 | 3.4 | 33 |
| 27.81 | 3.2 | 10 |
| 28.52 | 3.1 | 17 |
| ι(„jota")-phase: | | |
| 4.20 | 21.1 | 100 |
| 8.35 | 10.6 | 93 |
| 10.86 | 8.1 | 60 |
| 11.42 | 7.7 | 35 |
| 12.37 | 7.2 | 56 |
| 13.84 | 6.4 | 32 |
| 15.48 | 5.7 | 64 |
| 15.94 | 5.6 | 40 |
| 16.45 | 5.4 | 43 |
| 17.05 | 5.2 | 33 |
| 17.50 | 5.1 | 31 |
| 18.59 | 4.8 | 63 |
| 19.58 | 4.5 | 47 |
| 19.86 | 4.5 | 52 |
| 20.80 | 4.3 | 42 |
| 21.13 | 4.2 | 32 |
| 21.30 | 4.1 | 35 |
| 21.64 | 4.1 | 34 |
| 22.14 | 4.0 | 26 |
| 22.33 | 4.0 | 29 |
| 22.77 | 3.9 | 36 |
| 23.25 | 3.8 | 39 |
| 23.59 | 3.8 | 93 |
| 24.07 | 3.7 | 45 |
| 25.49 | 3.5 | 64 |
| 26.46 | 3.4 | 55 |
| 26.69 | 3.3 | 35 |
| 29.49 | 3.0 | 45 |
| κ(„kappa")-phase: | | |
| 6.55 | 13.5 | 32 |
| 12.62 | 7.0 | 26 |
| 12.99 | 6.8 | 28 |
| 13.73 | 6.4 | 50 |
| 14.33 | 6.2 | 36 |
| 15.01 | 5.9 | 32 |
| 15.47 | 5.7 | 30 |
| 16.30 | 5.4 | 24 |
| 16.78 | 5.3 | 23 |

-continued

| 2Θ | d | $I_{rel}$ |
|---|---|---|
| 17.14 | 5.2 | 38 |
| 18.31 | 4.8 | 60 |
| 18.70 | 4.7 | 44 |
| 20.39 | 4.4 | 25 |
| 24.33 | 3.4 | 22 |
| 24.70 | 3.6 | 38 |
| 25.34 | 3.5 | 48 |
| 26.14 | 3.4 | 100 |
| 27.24 | 3.3 | 27 |
| 28.00 | 3.2 | 24 |
| 28.25 | 3.2 | 24 |
| 29.91 | 3.0 | 22 |

λ („lambda")-phase:

| 2Θ | d | $I_{rel}$ |
|---|---|---|
| 5.03 | 17.5 | 100 |
| 5.35 | 16.5 | 57 |
| 6.88 | 12.8 | 26 |
| 9.43 | 9.4 | 23 |
| 11.09 | 8.0 | 30 |
| 13.78 | 6.4 | 17 |
| 14.36 | 6.2 | 21 |
| 15.70 | 5.6 | 15 |
| 18.25 | 4.9 | 18 |
| 18.90 | 4.7 | 19 |
| 20.36 | 4.4 | 16 |
| 20.68 | 4.3 | 16 |
| 21.38 | 4.2 | 15 |
| 22.90 | 3.9 | 18 |
| 24.46 | 3.6 | 22 |
| 25.00 | 3.6 | 18 |
| 26.14 | 3.4 | 28 |
| 28.54 | 3.1 | 14 |

ν („ny")-phase:

| 2Θ | d | $I_{rel}$ |
|---|---|---|
| 4.76 | 18.5 | 64 |
| 7.70 | 11.5 | 43 |
| 9.22 | 9.6 | 24 |
| 9.50 | 9.3 | 46 |
| 11.64 | 7.6 | 15 |
| 12.74 | 6.9 | 21 |
| 13.43 | 6.6 | 33 |
| 13.76 | 6.4 | 15 |
| 14.11 | 6.3 | 13 |
| 14.27 | 6.2 | 15 |
| 15.72 | 5.6 | 16 |
| 16.26 | 5.4 | 10 |
| 17.37 | 5.1 | 12 |
| 17.73 | 5.0 | 20 |
| 18.95 | 4.7 | 20 |
| 19.91 | 4.5 | 20 |
| 20.45 | 4.3 | 12 |
| 20.87 | 4.3 | 19 |
| 21.51 | 4.1 | 13 |
| 22.79 | 3.9 | 21 |
| 23.12 | 3.8 | 28 |
| 23.44 | 3.8 | 20 |
| 24.59 | 3.6 | 17 |
| 25.26 | 3.5 | 49 |
| 25.96 | 3.4 | 29 |
| 26.35 | 3.4 | 100 |
| 27.05 | 3.3 | 44 |
| 28.03 | 3.2 | 14 |
| 28.72 | 3.1 | 10 |
| 29.38 | 3.0 | 8 |
| 29.89 | 3.0 | 7 |
| 31.30 | 2.9 | 9 |
| 32.12 | 2.8 | 7 |
| 32.50 | 2.8 | 9 |
| 33.27 | 2.7 | 8 |

ξ („xi")-phase:

| 2Θ | d | $I_{rel}$ |
|---|---|---|
| 4.88 | 18.1 | ca. 50 |
| 7.83 | 11.3 | 100 |
| 8.59 | 10.3 | 39 |
| 11.57 | 7.6 | 21 |
| 15.76 | 5.6 | 34 |
| 17.06 | 5.2 | 46 |
| 17.40 | 5.1 | 24 |
| 19.66 | 4.5 | 36 |
| 19.99 | 4.4 | 54 |
| 20.40 | 4.4 | 27 |
| 21.41 | 4.1 | 28 |
| 21.83 | 4.1 | 31 |
| 24.49 | 3.6 | 68 |
| 25.00 | 3.6 | ca. 70 |
| 26.83 | 3.3 | 21 |
| 27.15 | 3.3 | 17 |
| 31.33 | 2.9 | 20 |
| 31.60 | 2.8 | 18 | o („omikron")-phase:

| 2Θ | d | $I_{rel}$ |
|---|---|---|
| 12.54 | 7.1 | 58 |
| 13.61 | 6.5 | 44 |
| 17.33 | 5.1 | 47 |
| 18.64 | 4.8 | 52 |
| 19.48 | 4.6 | 26 |
| 24.56 | 3.6 | 100 |
| 25.43 | 3.5 | 56 |

π („pi")-phase:

| 2Θ | d | $I_{rel}$ |
|---|---|---|
| 5.60 | 15.8 | 100 |
| 9.09 | 9.7 | 82 |
| 9.62 | 9.2 | 72 |
| 11.21 | 7.9 | 27 |
| 11.65 | 7.6 | 4 |
| 12.86 | 6.9 | 5 |
| 15.24 | 5.8 | 6 |
| 15.88 | 5.6 | 22 |
| 16.85 | 5.3 | 14 |
| 18.23 | 4.9 | 21 |
| 19.07 | 4.7 | 35 |
| 19.40 | 4.6 | 54 |
| 20.82 | 4.3 | 20 |
| 22.23 | 4.0 | 24 |
| 23.02 | 3.9 | 27 |
| 23.49 | 3.8 | 23 |
| 24.79 | 3.6 | 98 |
| 26.01 | 3.4 | 41 |
| 27.66 | 3.2 | 75 |
| 28.20 | 3.2 | 10 |
| 30.12 | 3.0 | 9 |
| 30.85 | 2.9 | 9 |
| 31.34 | 2.9 | 9 |
| 31.52 | 2.8 | 6 |
| 31.59 | 2.8 | 6 |

ρ („rho")-phase:

| 2Θ | d | $I_{rel}$ |
|---|---|---|
| 4.96 | 17.8 | 100 |
| 6.05 | 14.6 | 60 |
| 8.48 | 10.4 | 22 |
| 9.95 | 8.9 | 14 |
| 13.93 | 6.4 | 13 |
| 15.12 | 5.9 | 13 |
| 15.51 | 5.7 | 13 |
| 17.54 | 5.1 | 14 |
| 19.41 | 4.6 | 14 |
| 20.99 | 4.2 | 12 |
| 21.50 | 4.1 | 14 |
| 24.64 | 3.6 | 13 |
| 25.44 | 3.5 | 23 |
| 26.00 | 3.4 | 40 |
| 26.89 | 3.3 | 16 |
| 28.15 | 3.2 | 11 | or a mixture thereof.

9. A C.I. Pigment Red 53:2 mixture or mixed crystal containing at least 10% by weight, of one or more of the phases selected from the group consisting of:

| 2Θ | d | I_rel |
|---|---|---|
| ε(epsilon)-phase: | | |
| 4.48 | 19.7 | 55 |
| 5.87 | 15.1 | 36 |
| 7.08 | 12.5 | 61 |
| 7.87 | 11.2 | 100 |
| 9.01 | 9.8 | 32 |
| 9.84 | 9.0 | 49 |
| 11.84 | 7.5 | 25 |
| 12.47 | 7.1 | 32 |
| 14.31 | 6.2 | 26 |
| 14.80 | 6.0 | 27 |
| 15.29 | 5.8 | 26 |
| 15.82 | 5.6 | 58 |
| 16.80 | 5.3 | 27 |
| 17.23 | 5.1 | 29 |
| 18.80 | 4.7 | 40 |
| 19.40 | 4.6 | 27 |
| 19.82 | 4.5 | 46 |
| 20.66 | 4.3 | 33 |
| 21.44 | 4.1 | 29 |
| 21.88 | 4.1 | 36 |
| 22.69 | 3.9 | 17 |
| 23.14 | 3.8 | 19 |
| 23.85 | 3.7 | 40 |
| 24.63 | 3.6 | 34 |
| 25.48 | 3.5 | 32 |
| 26.12 | 3.4 | 76 |
| 26.42 | 3.4 | 65 |
| 27.91 | 3.2 | 26 |
| 28.76 | 3.1 | 29 |
| 29.88 | 3.0 | 12 |
| 30.30 | 2.9 | 12 |
| 31.68 | 2.8 | 20 |
| 31.98 | 2.8 | 13 |
| 32.36 | 2.8 | 16 |
| 32.60 | 2.7 | 17 |
| ζ(zeta)-phase: | | |
| 5.10 | 17.3 | 24 |
| 7.13 | 12.4 | 62 |
| 7.97 | 11.1 | 100 |
| 10.09 | 8.8 | 68 |
| 14.27 | 6.2 | 54 |
| 14.67 | 6.0 | 24 |
| 15.92 | 5.6 | 14 |
| 17.13 | 5.2 | 18 |
| 17.84 | 5.0 | 40 |
| 18.70 | 4.7 | 18 |
| 19.07 | 4.7 | 20 |
| 19.93 | 4.5 | 29 |
| 21.53 | 4.1 | 26 |
| 22.76 | 3.9 | 56 |
| 23.58 | 3.8 | 92 |
| 24.58 | 3.6 | 28 |
| 25.25 | 3.5 | 16 |
| 25.95 | 3.4 | 99 |
| 27.38 | 3.3 | 29 |
| 27.95 | 3.2 | 14 |
| 28.62 | 3.1 | 48 |
| η(eta)-phase: | | |
| 4.57 | 19.3 | 100 |
| 9.07 | 9.7 | 68 |
| 12.18 | 7.3 | 45 |
| 14.77 | 6.0 | 65 |
| 21.09 | 4.2 | 30 |
| 26.60 | 3.3 | 96 |
| θ(theta)-phase: | | |
| 5.17 | 17.0 | 26 |
| 10.34 | 8.5 | 13 |
| 12.17 | 7.3 | 9 |
| 13.24 | 6.7 | 10 |
| 14.60 | 6.1 | 23 |
| 15.79 | 5.6 | 15 |
| 16.63 | 5.3 | 27 |

-continued

| 2Θ | d | I_rel |
|---|---|---|
| 17.80 | 5.0 | 28 |
| 18.04 | 4.9 | 16 |
| 19.71 | 4.5 | 13 |
| 21.06 | 4.2 | 17 |
| 24.08 | 3.7 | 12 |
| 24.47 | 3.6 | 12 |
| 25.82 | 3.4 | 100 |
| 26.67 | 3.4 | 33 |
| 27.81 | 3.2 | 10 |
| 28.52 | 3.1 | 17 |
| ι(jota)-phase: | | |
| 4.20 | 21.1 | 100 |
| 8.35 | 10.6 | 93 |
| 10.86 | 8.1 | 60 |
| 11.42 | 7.7 | 35 |
| 12.37 | 7.2 | 56 |
| 13.84 | 6.4 | 32 |
| 15.48 | 5.7 | 64 |
| 15.94 | 5.6 | 40 |
| 16.45 | 5.4 | 43 |
| 17.05 | 5.2 | 33 |
| 17.50 | 5.1 | 31 |
| 18.59 | 4.8 | 63 |
| 19.58 | 4.5 | 47 |
| 19.86 | 4.5 | 52 |
| 20.80 | 4.3 | 42 |
| 21.13 | 4.2 | 32 |
| 21.30 | 4.1 | 35 |
| 21.64 | 4.1 | 34 |
| 22.14 | 4.0 | 26 |
| 22.33 | 4.0 | 29 |
| 22.77 | 3.9 | 36 |
| 23.25 | 3.8 | 39 |
| 23.59 | 3.8 | 93 |
| 24.07 | 3.7 | 45 |
| 25.49 | 3.5 | 64 |
| 26.46 | 3.4 | 55 |
| 26.69 | 3.3 | 35 |
| 29.49 | 3.0 | 45 |
| κ(kappa)-phase: | | |
| 6.55 | 13.5 | 32 |
| 12.62 | 7.0 | 26 |
| 12.99 | 6.8 | 28 |
| 13.73 | 6.4 | 50 |
| 14.33 | 6.2 | 36 |
| 15.01 | 5.9 | 32 |
| 15.47 | 5.7 | 30 |
| 16.30 | 5.4 | 24 |
| 16.78 | 5.3 | 23 |
| 17.14 | 5.2 | 38 |
| 18.31 | 4.8 | 60 |
| 18.70 | 4.7 | 44 |
| 20.39 | 4.4 | 25 |
| 24.33 | 3.4 | 22 |
| 24.70 | 3.6 | 38 |
| 25.34 | 3.5 | 48 |
| 26.14 | 3.4 | 100 |
| 27.24 | 3.3 | 27 |
| 28.00 | 3.2 | 24 |
| 28.25 | 3.2 | 24 |
| 29.91 | 3.0 | 22 |
| λ(lambda)-phase: | | |
| 5.03 | 17.5 | 100 |
| 5.35 | 16.5 | 57 |
| 6.88 | 12.8 | 26 |
| 9.43 | 9.4 | 23 |
| 11.09 | 8.0 | 30 |
| 13.78 | 6.4 | 17 |
| 14.36 | 6.2 | 21 |
| 15.70 | 5.6 | 15 |
| 18.25 | 4.9 | 18 |
| 18.90 | 4.7 | 19 |
| 20.36 | 4.4 | 16 |
| 20.68 | 4.3 | 16 |

-continued

| 2Θ | d | $I_{rel}$ |
|---|---|---|
| 21.38 | 4.2 | 15 |
| 22.90 | 3.9 | 18 |
| 24.46 | 3.6 | 22 |
| 25.00 | 3.6 | 18 |
| 26.14 | 3.4 | 28 |
| 28.54 | 3.1 | 14 |
| ν(ny)-phase: | | |
| 4.76 | 18.5 | 64 |
| 7.70 | 11.5 | 43 |
| 9.22 | 9.6 | 24 |
| 9.50 | 9.3 | 46 |
| 11.64 | 7.6 | 15 |
| 12.74 | 6.9 | 21 |
| 13.43 | 6.6 | 33 |
| 13.76 | 6.4 | 15 |
| 14.11 | 6.3 | 13 |
| 14.27 | 6.2 | 15 |
| 15.72 | 5.6 | 16 |
| 16.26 | 5.4 | 10 |
| 17.37 | 5.1 | 12 |
| 17.73 | 5.0 | 20 |
| 18.95 | 4.7 | 20 |
| 19.91 | 4.5 | 20 |
| 20.45 | 4.3 | 12 |
| 20.87 | 4.3 | 19 |
| 21.51 | 4.1 | 13 |
| 22.79 | 3.9 | 21 |
| 23.12 | 3.8 | 28 |
| 23.44 | 3.8 | 20 |
| 24.59 | 3.6 | 17 |
| 25.26 | 3.5 | 49 |
| 25.96 | 3.4 | 29 |
| 26.35 | 3.4 | 100 |
| 27.05 | 3.3 | 44 |
| 28.03 | 3.2 | 14 |
| 28.72 | 3.1 | 10 |
| 29.38 | 3.0 | 8 |
| 29.89 | 3.0 | 7 |
| 31.30 | 2.9 | 9 |
| 32.12 | 2.8 | 7 |
| 32.50 | 2.8 | 9 |
| 33.27 | 2.7 | 8 |
| ξ(xi)-phase: | | |
| 4.88 | 18.1 | ca. 50 |
| 7.83 | 11.3 | 100 |
| 8.59 | 10.3 | 39 |
| 11.57 | 7.6 | 21 |
| 15.76 | 5.6 | 34 |
| 17.06 | 5.2 | 46 |
| 17.40 | 5.1 | 24 |
| 19.66 | 4.5 | 36 |
| 19.99 | 4.4 | 54 |
| 20.40 | 4.4 | 27 |
| 21.41 | 4.1 | 28 |
| 21.83 | 4.1 | 31 |
| 24.49 | 3.6 | 68 |
| 25.00 | 3.6 | ca. 70 |
| 26.83 | 3.3 | 21 |
| 27.15 | 3.3 | 17 |
| 31.33 | 2.9 | 20 |
| 31.60 | 2.8 | 18 |
| o(omikron)-phase: | | |
| 12.54 | 7.1 | 58 |
| 13.61 | 6.5 | 44 |
| 17.33 | 5.1 | 47 |
| 18.64 | 4.8 | 52 |
| 19.48 | 4.6 | 26 |
| 24.56 | 3.6 | 100 |
| 25.43 | 3.5 | 56 |

-continued

| 2Θ | d | $I_{rel}$ |
|---|---|---|
| π(pi)-phase: | | |
| 5.60 | 15.8 | 100 |
| 9.09 | 9.7 | 82 |
| 9.62 | 9.2 | 72 |
| 11.21 | 7.9 | 27 |
| 11.65 | 7.6 | 4 |
| 12.86 | 6.9 | 5 |
| 15.24 | 5.8 | 6 |
| 15.88 | 5.6 | 22 |
| 16.85 | 5.3 | 14 |
| 18.23 | 4.9 | 21 |
| 19.07 | 4.7 | 35 |
| 19.40 | 4.6 | 54 |
| 20.82 | 4.3 | 20 |
| 22.23 | 4.0 | 24 |
| 23.02 | 3.9 | 27 |
| 23.49 | 3.8 | 23 |
| 24.79 | 3.6 | 98 |
| 26.01 | 3.4 | 41 |
| 27.66 | 3.2 | 75 |
| 28.20 | 3.2 | 10 |
| 30.12 | 3.0 | 9 |
| 30.85 | 2.9 | 9 |
| 31.34 | 2.9 | 9 |
| 31.52 | 2.8 | 6 |
| 31.59 | 2.8 | 6 |
| ρ(rho)-phase: | | |
| 4.96 | 17.8 | 100 |
| 6.05 | 14.6 | 60 |
| 8.48 | 10.4 | 22 |
| 9.95 | 8.9 | 14 |
| 13.93 | 6.4 | 13 |
| 15.12 | 5.9 | 13 |
| 15.51 | 5.7 | 13 |
| 17.54 | 5.1 | 14 |
| 19.41 | 4.6 | 14 |
| 20.99 | 4.2 | 12 |
| 21.50 | 4.1 | 14 |
| 24.64 | 3.6 | 13 |
| 25.44 | 3.5 | 23 |
| 26.00 | 3.4 | 40 |
| 26.89 | 3.3 | 16 |
| 28.15 | 3.2 | 11 | and a mixture thereof.

10. A method of coloring coatings, plastics, printing inks, electrophotographic toners and developers, powder coating materials, ink jet ink, color filters and seeds comprising adding C.I. Pigment Red 53:2 as claimed in claim 8 in an amount effective for imparting a color to said coatings, plastics, printing inks, electrophotographic toners and developers, powder coating materials, ink jet ink, color filters and seeds to be colored.

11. A method of coloring coatings, plastics, printing inks, electrophotographic toners and developers, powder coating materials, ink jet ink, color filters and seeds comprising adding the mixture or mixed crystal as claimed in claim 9 in an amount effective for imparting a color to said coatings, plastics, printing inks, electrophotographic toners and developers, powder coating materials, ink jet ink, color filters and seeds to be colored.

* * * * *